United States Patent [19]
Fauser et al.

[11] Patent Number: 5,951,213
[45] Date of Patent: Sep. 14, 1999

[54] MILLING CUTTER, PARTICULARLY FOR COPYING, AND CUTTING INSERT THEREFOR

[75] Inventors: Lothar Fauser, Nehren; Hans Peter Dürr, Gomaringen; Wolfgang Vötsch, Rangendingen; Siegfried Bohnet, Mössingen, all of Germany

[73] Assignee: Walter AG, Tübingen, Germany

[21] Appl. No.: 08/876,566

[22] Filed: Jun. 16, 1997

[30] Foreign Application Priority Data

Jun. 19, 1996 [DE] Germany ............................ 196 24 342

[51] Int. Cl.⁶ ..................................................... B23C 5/20
[52] U.S. Cl. .................................. 407/35; 407/42; 407/65; 407/113
[58] Field of Search ........................ 407/113, 35, 40, 407/42, 43, 48, 51, 54, 55, 60, 62, 64, 66, 114

[56] References Cited

U.S. PATENT DOCUMENTS

| | | | |
|---|---|---|---|
| D. 309,317 | 7/1990 | Tsujimura et al. ................... 407/40 X |
| 4,525,110 | 6/1985 | Stojanovski ............................. 407/40 |
| 4,527,930 | 7/1985 | Harroun . | |
| 4,808,045 | 2/1989 | Tsujimura et al. ................... 407/42 X |
| 4,927,303 | 5/1990 | Tsujimura et al. ................... 407/42 X |
| 5,580,194 | 12/1996 | Satran et al. .............................. 407/40 |
| 5,622,460 | 4/1997 | Satran et al. .......................... 407/54 X |
| 5,741,095 | 4/1998 | Charron et al. ............................ 407/42 |

FOREIGN PATENT DOCUMENTS

| | | |
|---|---|---|
| 0 505 740 A1 | 9/1992 | European Pat. Off. . |
| 0 504 608 | 7/1994 | European Pat. Off. . |
| 0 361 435 | 3/1995 | European Pat. Off. . |
| 38 07 119 A1 | 9/1988 | Germany . |
| 38 07 195 | 5/1992 | Germany . |

Primary Examiner—Andrea L. Pitts
Assistant Examiner—Henry W. H. Tsai
Attorney, Agent, or Firm—Frishauf, Holtz, Goodman, Langer & Chick, P.C.

[57] ABSTRACT

To facilitate manufacture and stocking of inserts for the ball end of a ball milling cutter, identical asymmetrical cutting inserts which are of generally pointed, elongated leaf shape, define two end points or tips, with two cutting edges opposite a theoretical straight line connecting the tips. The cutting edges (14, 15) each have at least one curved portion (24, 26) and an adjoining elongated, roughly straight portion (23, 25). The lengths of the respective curved portions and straight portions on the two cutting edges are different, and the edges and their respective lengths and positions with respect to an attachment hole (17) are so arranged that the first cutting edge of one insert on one side cuts on a ball surface which extends at least up to approximately the center line of the milling tool, and the straight cutting edge merges into a cylindrical surface. The curved portion (26) of the other cutting edge (15) of a second, identical insert completes the ball cutting surface and also merges into a cylindrical surface, so that, in operation, one longer and one shorter curved portion, respectively, on both inserts are actively cutting. When the cutting edges are worn, the inserts are interchanged on the respective plate seats of the milling cutter so that the previously inactive shorter or longer curved edge, cut at the end surface.

23 Claims, 6 Drawing Sheets

MILLING CUTTER, PARTICULARLY FOR COPYING, AND CUTTING INSERT THEREFOR

BACKGROUND OF THE INVENTION

The present invention relates to a milling cutter, and especially a shaft-type, ball-end, copying-type milling cutter, and cutting inserts therefor, in which the cutting inserts have curved cutting edges in a face region of the ball milling cutter, when assembled to the head of the ball milling cutter.

BACKGROUND

Milling cutters of the shaft type having a ball end, which are also adapted for copying work, are usually furnished with indexable cutting inserts which are so arranged and placed on the milling cutter that they define a complete cutting edge extending from an axis of rotation of the milling cutter to an end point at its outer circumference. The complete cutting edge is a theoretical edge which is formed by a plurality of overlapping cutting edges of the inserts. Active cutting edges of the respective inserts define a portion or a section of the cutting edge. Due to the curved shape of the cutting edges in the end region of the cutter, different indexable cutting inserts were needed to be assembled to the milling cutter as such. This is particularly apparent because of the axial offset of the cutting plates which is necessary in order to obtain overlap of the overall, theoretical cutting edge.

German Patent 38 07 195, Tsujimura et al, is an example of a ball end milling cutter which has two indexable insert seats which are offset with respect to the axis of rotation of the cutter by 180° with respect to each other. Indexable cutting inserts with curved cutting edges are secured to the two plate or insert seats. The indexable inserts are different from each other. Each insert is, however, symmetrical with respect to its attachment hole, so that the insert can be turned when a cutting edge thereof becomes dull, and the insert can be continued to be used with its second cutting edge. The cutting edge of one of the two inserts extends up to the axis of rotation of the tool. The curved cutting edge of the other indexable inserts terminates some distance from the axis of rotation. The insert which has the cutting edge which does not reach the axis of rotation has a straight cutting edge portion which extends up to the circumferential region of the milling tool.

The two inserts which are matched with respect to each other for the plate seats at the end face of the milling cutter have differently shaped cutting edges. These inserts, however, must be matched with respect to each other, which complicates at least the manufacture and stocking of the inserts.

European Patent 0 361 435 B1, Tsujimura et al., describes a ball end mill in which the shaft of the end mill, as well as its axial region, has axially respectively offset, radially oppositely placed plate seats. The indexable cutting inserts have straight or curved cutting edges. Three different indexable inserts are used. Essentially square inserts are provided in the shaft region; in the end region, two different inserts are utilized. The inserts are symmetrical with respect to an attachment hole which is roughly in the center thereof, and have cutting edges which have a curved portion. The cutting edges of two respectively oppositely positioned sides of each insert correspond to each other.

European Patent 0 504 608 B1, Shiratori et al., describes a ball end mill which has symmetrically shaped cutting bits with two cutting edges which, each, have a curved portion and a straight portion, when looked at in a top view. The mill has two respectively radially oppositely located plate seats which are axially offset with respect to each other. The axially forwardly located plate seat carries a cutting insert with curved cutting edges. The axially further rearwardly located plate seat carries a cutting insert with short, curved, and adjoining longer, straight cutting edge portions.

This mill also requires two differently shaped inserts which are matched to each other. The cutting edges of the inserts, which must be manufactured separately, must be matched precisely with respect to each other, since the respective match of the inserts influences the working accuracy of the milling cutter as a whole.

It is known from manufacturing practice to use ball-type end mills which, in the end region, have two differently located triangular inserts secured to two plate seats. The triangular inserts define a single cutting edge. Each triangular insert has a first curved cutting edge, and a second cutting edge with a curved portion and a straight portion. A third, relatively long, edge is not used.

The speed of feed must be so determined that only one complete cutting edge is present.

THE INVENTION

It is an object to provide a ball-type mill, and cutting inserts therefor, which, with small or substantially decreased manufacturing costs, permits high feeding speeds; and which reduces separate manufacturer stocking and storing of inserts by 50%.

Briefly, a milling cutter which has a shaft and a rounded end head has two plate seats at the head, which are diametrically opposite each other. The plate seats are adapted to receive asymmetrical cutting inserts. The cutting inserts are identical, and are plate-like elements of generally pointed, elongated leaf or prune-pit shape, defining two end points or tips, and having, each, two cutting edges. A first one of the cutting edges has a longer curved portion and a shorter straight portion; the other cutting edge of the insert has a shorter curved portion and a longer straight portion. The first cutting edge is so shaped that it is on a ball surface which merges into a cylindrical surface when the respective insert is secured to a first plate seat with the respective cutting edge in active position. The other cutting edge forms a ball surface which merges into a cylinder when it is effective and the insert is mounted on the other plate seat with the other cutting edge in operating condition.

In accordance with the present invention, thus, the two cutting edges of any one of the inserts have different outlines. Both cutting edges of any insert have a curved portion and a straight portion joined thereto. The straight portion, when fitting to the milling cutter, projects to a straight line in circumferential direction in a longitudinal plane passing through the axis of the milling cutter. The portions of the cutting edges are so shaped and so arranged on the two tip cutting inserts that each cutting edge can always be associated with another plate seat, so that the edges defined between the two end tips, over their entire length, form completed tool cutting edges. This means that both plate seats at the facing end of the milling cutter can be fitted with inserts of a single type. The insert on a first plate seat cuts or is active with a first cutting edge; the insert on the second plate seat is active with a second cutting edge which, in its shape, differs from the first cutting edge. When both cutting edges of both inserts are worn or become dull, it is only necessary to interchange the inserts on the plate seats and, as so interchanged, likewise, interchanging the respective cutting edges; and then securing the inserts to the respective seat on the milling cutter.

When the cutting inserts are interchanged, they must be turned and repositioned, and rotated in accordance with the angle between their clearance surfaces, or the angle of their straight cutting edges, respectively. Repositioning and interchanging the inserts permits sequential utilization of both cutting edges of the inserts over their entire length and over their entire circumference, in sequential operations.

The arrangement, thus, permits utilization of a single type of cutting insert to equip the milling head with the cutting inserts. The inserts, since they are of a single type, can be made in one single production step. This results in significant decrease of fine adjustment work, as well as in stocking and storing requirements.

The two cutting edges of any one of the inserts are unsymmetrical with respect to each other, especially with respect to the different lengths of the curved portion of the cutting edges. Due to this difference in length, the longer curved portion of the cutting edge can ready up to the axis of rotation of the milling head, or even intersect this axis, whereas the curved portion of the other inserts has an edge which is spaced from the axis of rotation. In the center region, there is a single cutting edge, whereas in the remaining curved region, two full edges are provided. This permits a feed speed which can be doubled with respect to a single cutting tool, particularly in the radial direction.

The different lengths of the straight cutting edge portions permit continuation of the edge with further, for example square, rectangular or triangular inserts. With two rows of inserts on the cutting tool, sufficient overlap of inserts can be obtained.

Preferably, the two cutting edges of an insert merge in the tip region against each other, although this is not absolutely necessary. The merger, preferably, is defined by a small radius, that is, a curved rounding.

The straight portions of the cutting edges form an acute angle of, for example about 11°. This results in a slim insert with long cutting edges.

The straight portions need not be mathematically straight, but in dependence on the design position of the tool, they can be formed somewhat ellipse-shaped, curved, as straight lines, polygonal sections, or the like. The cutting edges between the two tips merge into each other, that is, they do not form pronounced corners. In other words, in any one point of the cutting edges, only one tangent need be precisely defined.

The attachment opening for the inserts is preferably generally centrally located, and the cutting edge, in this region, should be relatively thick. The attachment opening is surrounded by a planar surface, raised with respect to the remaining chip removal surface of the insert. This construction increases the stability of the insert.

Clearance surfaces adjoint eh cutting edges and, preferably, are subdivided, so that first, immediately adjacent the cutting edges, a smaller clearance angle, and later on, more remote from the cutting edges, a larger clearance angle will obtain. This arrangement improves the quality of the surface which is cut and permits design of milling cutters having a small diameter, without excessive decrease in the thickness of the plate of the cutting inserts.

Preferably, the milling cutter itself and the cutting inserts are so constructed that they form interengaging surfaces to receive and absorb axial forces acting on the inserts. Such interengaging surfaces can be formed in the region of the engagement surface or plate seats in the shape of recesses or projections. A particularly simple and reliable embodiment is an engagement surface formed in the corner region of the cutting edges which has a matching engagement surface on the plate seat. The engagement surface is spaced by a small distance with respect to the cutting edge, which, in the corner region, is rounded, with a curve of small radius. Due the space between the engagement surface and the cutting edges, larger axial forces can be absorbed at the tip region of the insert, without damage to the cutting edge.

The chip removal surfaces associated with the respective plate seats on the cutting tool are preferably matched to the course of the cutting edges. When looking at the inserts held on the respective plate seat in an end view, the inserts appear as a straight line. When looked at in radial direction, the cutting edge is curved. This is true for the active, that is, radially outwardly cutting edge, as well as for the passive, that is, radially inwardly positioned cutting edge of any one of the indexable inserts. The plate seat formed on the milling tool has engagement and protective surfaces for the clearance surfaces and the cutting edges of the respective insert, which follow the contour of the insert itself. These protective surface overlap the cutting edges and are relieved or chamfered or inclined. The function is such that chips removed in operation cannot damage the passive cutting edges which are protected by the respective engagement and protecting surfaces.

DRAWINGS

FIG. 3b is an end view of FIG. 3a;

FIG. 3c is a side view like FIG. 3a, but rotated by 180° with respect to FIG. 3a;

DETAILED DESCRIPTION

Figure 1:
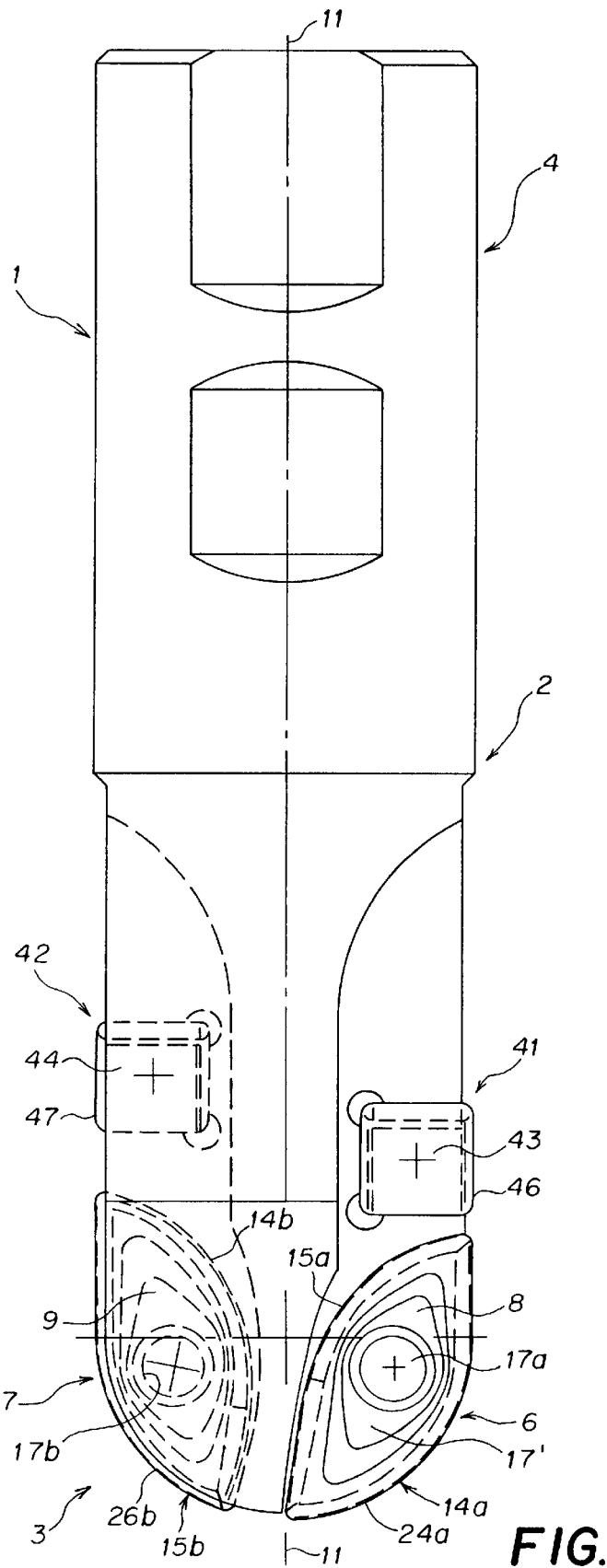
FIG. 1 is a highly schematic front view of the end region of a ball copying-type milling cutter, fitted with asymmetrical cutting inserts, and in which the cutting edges are projected to a vertical central plane.

Referring first to FIG. 1, which shows a milling cutter 1 formed as a copying cutter: The milling cutter 1 has an essentially cylindrical tool body 2 which is rounded at an end 3. The opposite end 4 is shaped as a shaft for attachment to a suitable chuck, or other attachment system of a machine tool. The end of the tool shown in FIG. 2a is slightly modified. The tool head 3 has two plate seats 6, 7. Indexable cutting inserts 8, 9 are secured to the respective plate seats. The plate seat 6 extends up to a central axis of rotation 11, which corresponds to the longitudinal axis of the tool body 2. In use, the milling tool 1 rotates about this axis 11. The plate seat 7 terminates by some distance from the axis 11.

Figure 4:
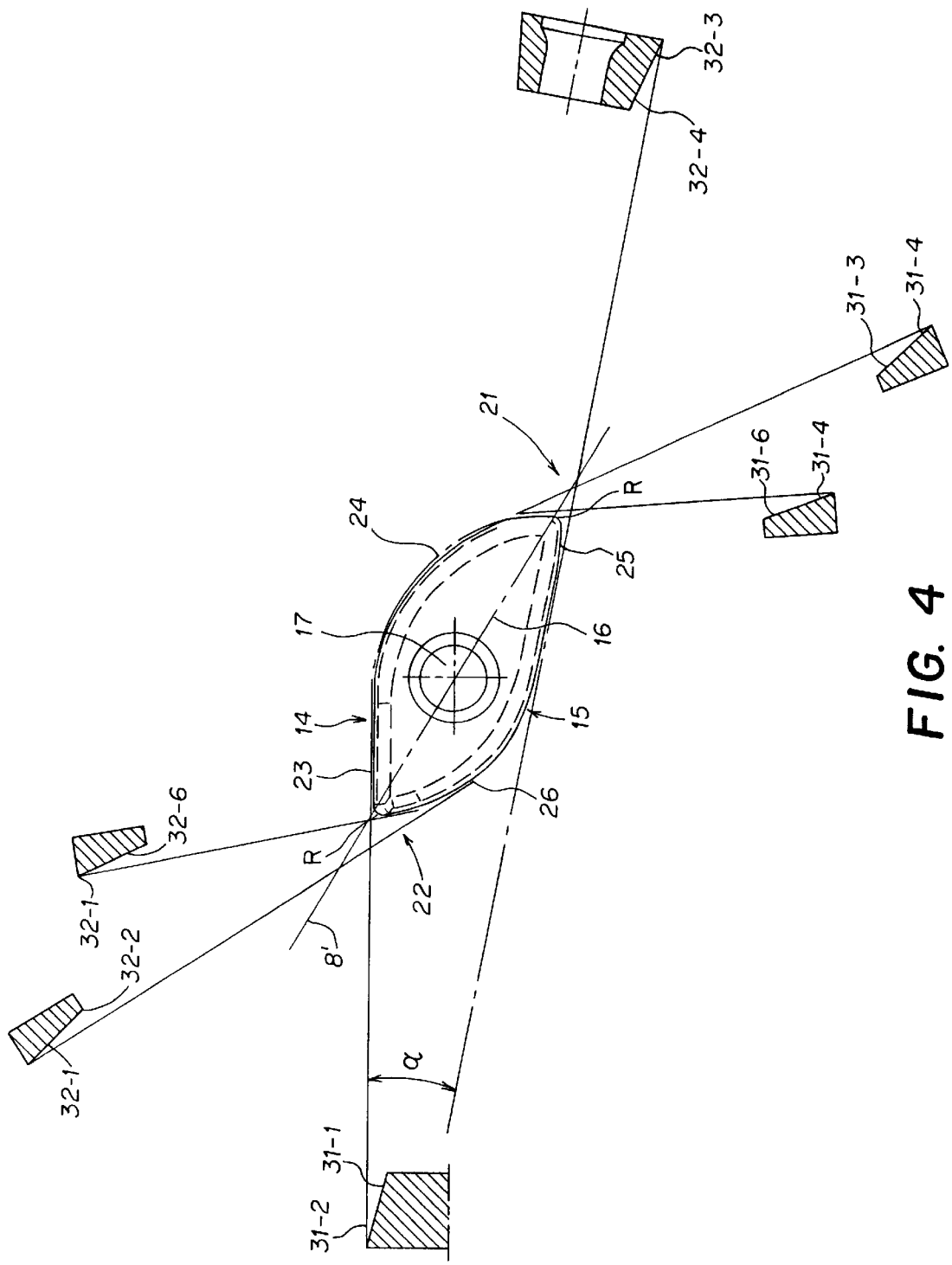
FIG. 4 is a top view of the insert for the end plate seat, with cross sections of the insert shown at selected cross-sectional positions.
Figure 5:
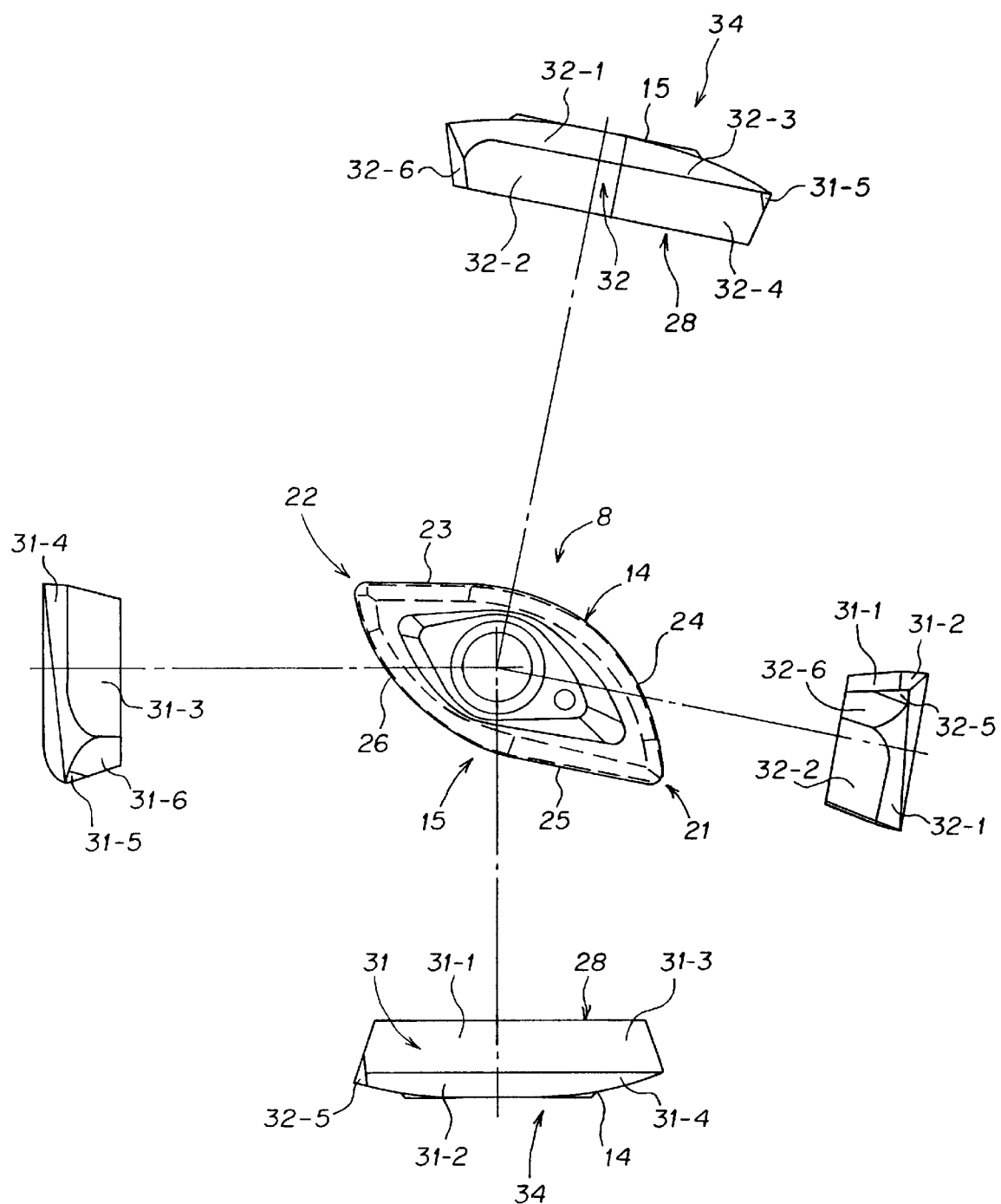
FIG. 5 shows the insert of FIG. 4 in a top view, with respective side views looking in the direction of the chain-dotted lines having their origin in the center of the attachment hole of the insert.

In accordance with a feature of the invention, the inserts 8, 9 are identical and, as best seen in FIGS. 4 and 5, have two differently shaped cutting edges 14, 15.

Since the cutting inserts 8, 9 are identical, the description to follow will limit itself to the cutting insert 8; in the Figures in which the two cutting inserts 8, 9 are shown, similar edges and surfaces of the inserts 8, 9 have been identified with alphabetical indices a, b, respectively.

The indexable insert is best seen in FIG. 4, to which reference will now be made. FIG. 4 is a simplified representation of an insert 8. It is a two-tip or two-corner insert with a plate-like base body 16. The base body 16 is formed with an attachment opening 17 located in a central portion of the base body. The plate seat 6 (FIG. 2a) has a tapped bore to receive a holding screw passing through opening 17.

In accordance with a feature of the invention, the cutting edges 14, 15 (FIG. 4) are asymmetrically located with respect to the through-hole or attachment opening 17. The cutting edges 14, 15 meet at the tips 21, 22 of the insert 8 and there merge together through a rounding, formed with a very small radius R. This radius R can be less than 1 millimeter. Due to the asymmetrical shape of the insert 8, the tips 21, 22 define a straight through-line 8' which, usually, does not pass through the center of the attachment hole 17. The tips 21, 22 have different spacing from the hole 17.

The cutting edge 14, in top view, has an elongated portion 23 which is markedly straight and a portion 24 which is markedly curved. The cutting edge 15 also has an elongated, essentially straight portion 25 and a curved portion 26. The elongated portions 23, 25 of the edges 14, 15 need not be mathematically straight, but may be slightly curved elliptical portions, or adjacent regions of portions of a polygon, or may have similar shape, for simplicity, hereinafter "essentially straight" or "elongated" portions. The elongated portions may also be formed by at least two straight portions which join each other with an obtuse angle of between 175° to 178°. Some curvature in the transition between the straight lines is also suitable.

The elongated portions 23, 25 merge, without corners, with the curved portions 24, 26. It is to be noted that the elongated or essentially straight or straight portions 23, 25 of the cutting edges 14, 15 have differential lengths. They are located at an acute angle α of, for example, about 11° with respect to each other. The elongated portion 23 is shorter than the elongated portion 25. Consequently, the curved portion 24 is longer than the curved portion 26. Thus, the portion 24, with its center of curvature, includes a larger angle than the portion 26. The radii of the curved portions 24, 26 are essentially alike; small derivations may be necessary in order to define a complete surface, in dependence on the position of the insert when secured to the tool 1. As best seen in FIG. 1, the curved portions 24, 26—in side view—of the tool 13 merge into essentially a semicircle, which possibly may be interrupted at the axis of rotation 11.

FIG. 5 shows the insert 8 with an essentially plane base surface 28, which can be fitted on and placed on the plane bottom surface 29, seen in FIG. 2a, of the respective plate seat 6. A clearance surface 31, 32, shown in the drawings as 31-1, 31-2 . . . 31-6, 32-1, 32-2 . . . 32-6, can be subdivided once or, preferably, into several subsurfaces as shown. The inclination of the thus formed facettes 31-1 to 31-6, and 32-1 to 32-6, forming subsurfaces, with respect to the base surface 28, is best seen in FIG. 4. The clearance surfaces 31, 32, collectively, are so subdivided that the facettes or subsurfaces 31-1, 31-3, 32-2, 32-4, 31-6, 32-6, which are away from the respective cutting edge 14, 15, are more inclined than the subsurfaces which are closer to the cutting edges 14, 15. Especially the subsurfaces 31-2, 32-3, adjoining the portions 23, 25 of the cutting edges 14, 15, are planar and include the acute angle α of about 11°, when measured with respect to a plane which is essentially parallel to the base plane 28, or the chip plane 34, respectively.

The plane subsurfaces 31, 32 formed at the corners 21, 22, also form engagement surfaces for axial abutment and support of the insert 8.

At the upper side, the insert 8 has a chip removal surface 34 (see FIG. 5) which, due to the curving of the cutting edges 14, 15, seen in side view, is bulged or also curved. A raised portion, with a planar surface 17' (FIG. 1) is formed in the region of the attachment opening 17.

FIG. 2a illustrates the plate seat associated with the insert 8. Engagement or abutment surfaces 36, 37, 38 are formed adjacent the base surface 29. These surfaces 36, 37, 38 are inclined in accordance with the inclination of the respective clearance subsurfaces, collectively 32, adjacent the inactive cutting edge 15, and are likewise subdivided similar to the adjacent free clearance subsurfaces. Correspondingly, engagement surfaces of the plate seat 7, not seen in FIG. 2a, are formed in accordance with the clearance surfaces 31 of the insert 9. The engagement surfaces 38 which, in portions, are planar, of the two plate seats 6, 7 are oriented essentially transversely to the axis of rotation or longitudinal axis 11 of the tool body 2. They are engagement surfaces for the subsurfaces 31-6, 32-6 of the inserts 8, 9, and thus accept axial forces which are applied on the cutting inserts 8, 9. Both plate seats 6, 7 have axial angles of 0° and radial angles of about −5°.

FIG. 1 shows that the plate seats 6, 7 belong to a series of plate seats, which include at least one further plate seat 41, 42 to receive inserts 43, 44 with straight cutting edges 46, 47. As shown, the inserts can be rectangular; they may also be differently shaped. The plate seats 41, 42 have been omitted from FIG. 2 for clarity. The plate seats 6, 7, just as the plate seats 41, 42, are axially offset with respect to each other, so that the cutting edges 14a, 46 of one row of inserts overlap with the cutting edges 15b, 47 of the other row of inserts. The number of cutting edges in the region of the ball-shaped end 3 of the tool 1, except within a region immediately adjacent the axis of rotation 11, is equal to 2, that region extending for a distance of preferably more than at least 5 mm. Only in the region immediately adjacent to or on the axis of rotation, the number of cutting edges is equal to 1. In the circumferential region, the inserts 43, 44 and the inserts 8, 9 are staggered and so placed that, circumferentially, at least one complete cutting edge will be defined.

Figure 3A:
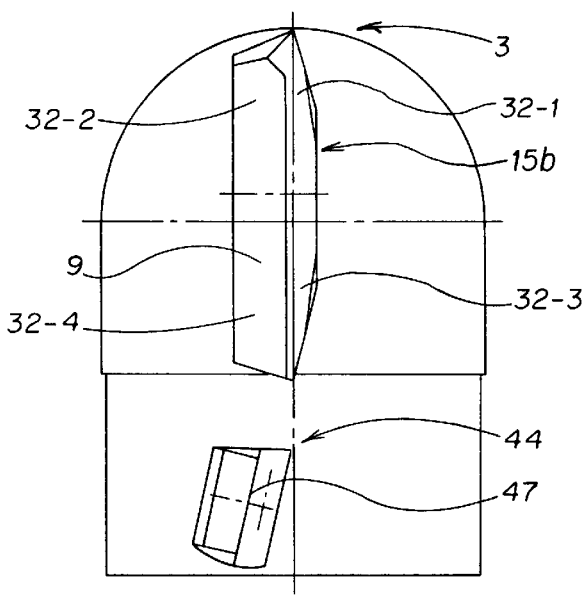
FIG. 3a is a highly schematic representation of the cutting tool of FIG. 1 in side view, and illustrating the insert fitted on the tool.
Figure 3B:
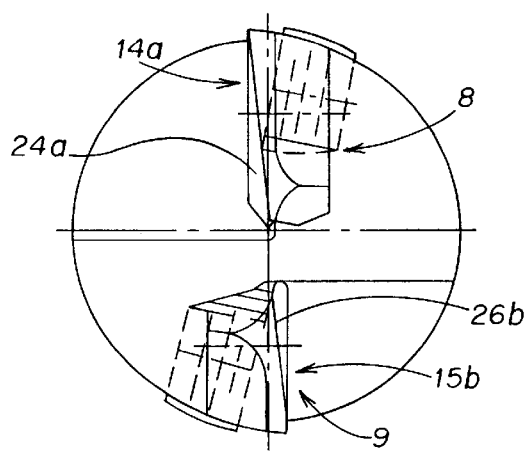
Figure 3C:
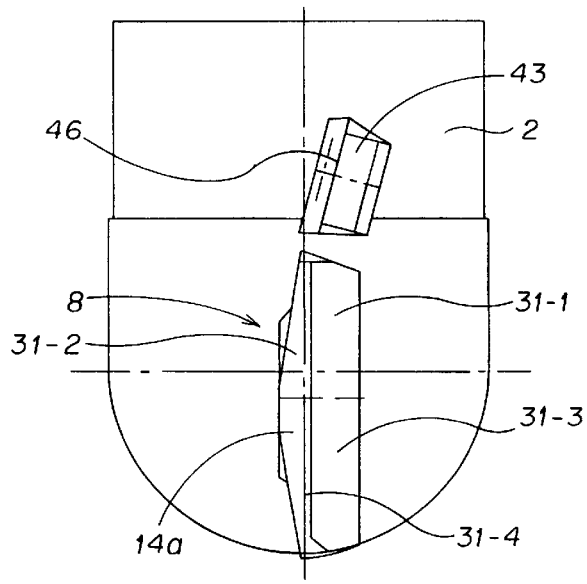

FIG. 1 is a projection of the inserts 8, 9 and of the inserts 43, 44 in a longitudinal plane. FIGS. 3a–3c illustrate the positioning of the inserts 8, 9 and of the inserts 43, 44, and hence the formation of the seats 6, 7, 41, 42. The inserts 8, 9 are radially oppositely located with respect to each other, see FIG. 3b. The curved portion 24a of the edge 14a of insert 8 defines an essentially straight line leading away from the viewer which intersects the axis 11 and then departs therefrom. The curved portion 26b of the cutting edge 15b is also located on an essentially straight line leading away from the viewer, which line, in the projection, is congruent with a radial line. In side view, the cutting edge 15b of the insert 9, however, is curved or bowed, as seen in FIG. 3a. The cutting edge 15b changes from a negative to a positive axial angle. The cutting edge 47 of the insert 44 is located in a prolongation of the cutting edge 15b, with about the same axial angle as that which obtains at the end of the cutting edge 15b remote from the end 3 of the tool body.

The side view of insert 8 in FIG. 3c, which is reversed to FIG. 3a by 180°, clearly shows the insert 8. Again, the curved cutting edge 14a changes from the end 3 of the tool body 2 from a negative to a positive axial angle. The cutting edge 46 of the subsequent insert 43 is in the prolongation of the cutting edge 14a.

USE AND OPERATION

In use, the tool body 2 of the tool 1 is supplied or fitted with two different types of cutting inserts: The inserts 8, 9, which are identical with respect to each other, and the inserts 43, 44, which likewise are identical. The inserts 43, 44 are true, standard indexable and reversible inserts, which means that upon wear or dulling of one cutting edge, the insert can be rotated, or rotated and turned, respectively, at its respective plate seat 41, 42. The inserts 8, 9, however, when the respective cutting edges become worn or dull, are rotated and repositioned or, in other words, they also exchange place or plate seats upon indexing. The tool body 2, thus, can be supplied with two inserts operative in the region of its rounded end which are identical, in other words, the inserts 8, 9 can be made in the same production step. This is particularly important with respect to tolerances which arise between theoretically identical inserts made in different production series. Tolerances, thus, with respect to differently made inserts, will not affect the accuracy of the milling tool 1, so that re-work of workpieces is effectively eliminated. It is not necessary to grind and polish the cutting edges 14–15.

Figure 2B:
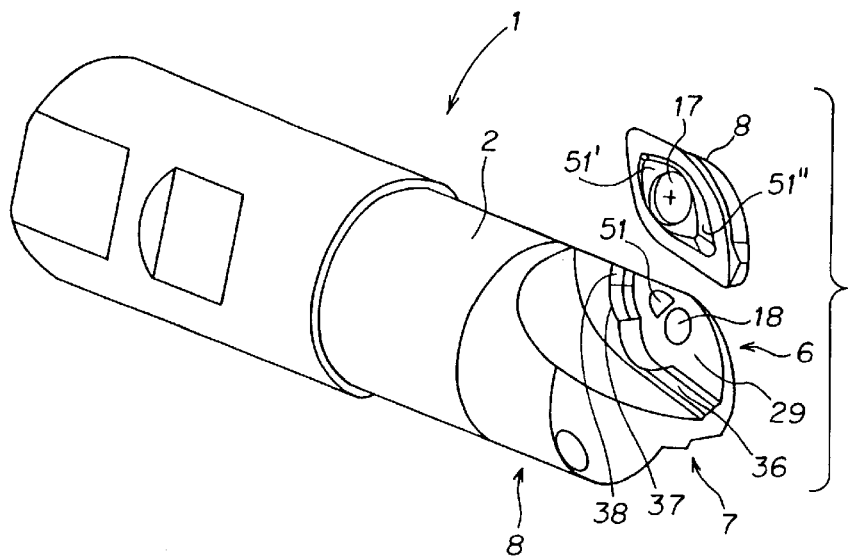
FIG. 2b is a highly schematic, perspective representation of the end mill similar to FIG. 2a and illustrating another embodiment.
Figure 2C:
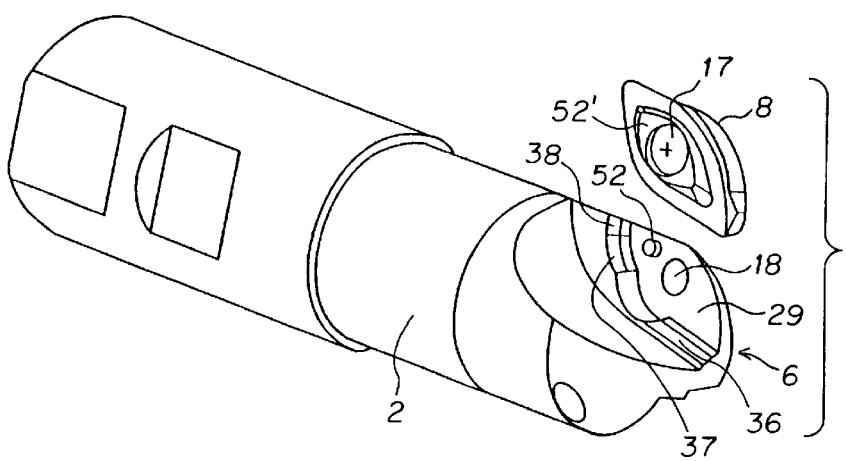
FIG. 2c is a highly schematic, perspective representation of the end mill similar to FIG. 2a, and illustrating yet another embodiment.
Figure 2A:
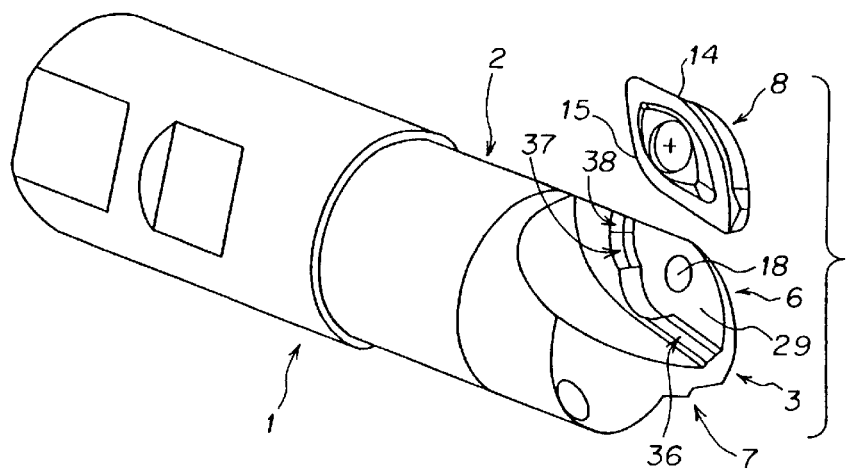
FIG. 2a is a detail view of the cutting tool of FIG. 1, with the insert removed, and illustrating axial support of the insert by engagement surfaces at the corners, in highly schematic, perspective representation.

FIG. 2b illustrates another embodiment of the present invention. As a replacement for the surfaces 31 and 32, or in addition thereto, interengaging projection-and-recess arrangements on the cutting elements and on the respective plate seats 6, 7 are provided to accept axial forces. In the embodiment of FIG. 2b, a projection 51 is formed on the plate seat 6, rising above the seat surface 29. The projection 51 is unitary with the tool body 2, and can engage in a recess 51' formed in the bottom of the insert 8. A further such recess 51" is provided in the insert 8 for cooperation with a similar projection formed on the plate seat 7 (not visible in FIG. 2b). As seen in FIG. 2c, rather than providing a unitary projection on the base surface 29 of the seat 6, a pin 52 can be provided which projects above the surface 29, located close to the tapped bore 18, which can engage in a recess 52' formed in the bottom of the insert 8.

Figure 6:
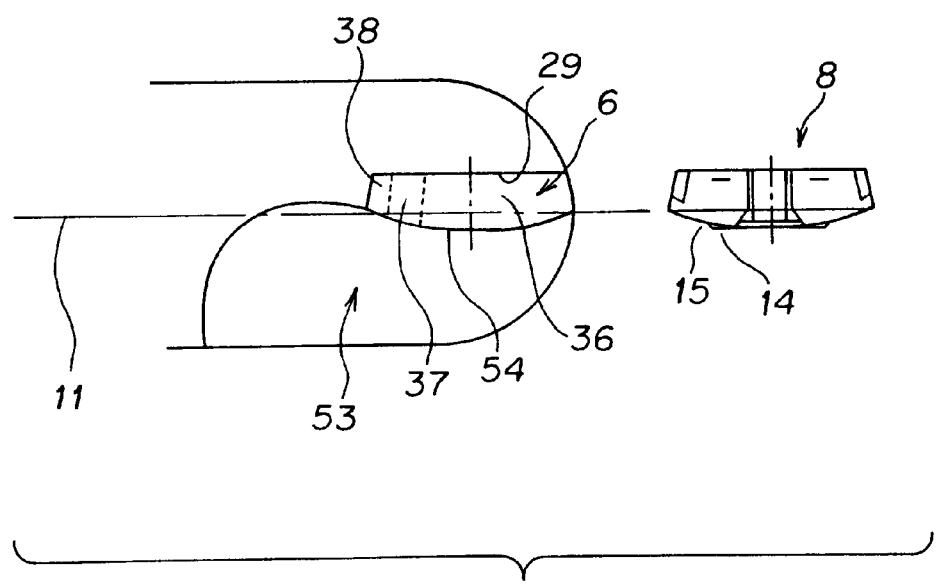
FIG. 6 is a highly schematic side view of the milling tool of FIGS. 1 and 2 (collectively) with chip space shaped to match the shape of the cutting inserts.

FIG. 6 illustrates a further improvement of the tool 1, with respect to the chip removal spaces 53. Engagement surfaces 36, 37 and, possibly, the engagement surface 38 with its upper edge 54, are opposite the plane bottom surface 29 of the plate 6. The surfaces are parallel to the axis 11. The inactive cutting edge 15 of the insert 8 faces the axis of rotation 11. Thus, the cutting edge 15 in the plate seat 6 is protected with respect to chips which, otherwise, could jam between the cutting edge 15 and other walls of the chip removal surface. Of course, the plate seat 7 is shaped in the same way.

The insert 8 is shown in FIG. 6 removed from the plate seat for ease of illustration, and clearly showing the matching of the respective surfaces to the surfaces and cutting edge 15 of the insert 8.

Various changes and modifications may be made, and any features described in connection with any one of the embodiments may be used with any of the others, within the scope of the inventive concept.

We claim:

1. A cutting insert (8), optionally for a ball end milling cutter (1), comprising:

a unitary, elongated plate-like base body (16) shaped to define two oppositely located tips (21, 22), and a theoretical connecting line (8') connecting said tips;

an essentially planar base surface (28) and an oppositely located chip surface (34);

lateral relief surfaces (31, 32) formed on sides of the plate-like body (16);

first and second cutting edges (14, 15), located at the intersection of the lateral relief surfaces and the chip surface (34), and positioned, with respect to said theoretical line (8') at opposite sides thereof, said first and second cutting edges (14, 15) each having at least one curved portion (24, 26) and an adjoining elongated portion (23, 25);

and wherein, the curved portion (24) of the first cutting edge (14) has a length which differs from the curved portion (26) of the second cutting edge (15);

wherein said elongated portions (23, 25) of the cutting edges (14, 15) are at an acute angle ($\alpha$) to each other different from null defined in a plane essentially parallel to said base surface (28), said acute angel ($\alpha$) is in the range of between 5° to 20°; and wherein an interengaging projection-and-recess arrangement is provided on the base body (16) and on a plate seat (41, 42) on the milling cutter (1), the arrangement including a recess (51', 51", 52') in the base body (16) and a projection (51, 52) on the plate seat fitting into the recess in the base body (16).

2. The insert of claim 1, wherein the curved portions (24, 26) and the adjoining elongated portions (23, 25) of the cutting edges (14, 15) merge smoothly into each other.

3. The insert of claim 1, wherein the curved portion (24) of the first cutting edge (14), with respect to a center of curvature thereof, extends over a first angular range;

wherein the curved portion (26) of the second cutting edge (15) with respect to a center of curvature thereof, extends over a second angular range different from said first range.

4. The insert of claim 1, wherein the first and second cutting edges (14, 15) in the region of said oppositely located tips (21, 22) adjoin each other.

5. The insert of claim 4, wherein the first and second cutting edges (14, 15) in the regions of said tips (21, 22) adjoin each other in a rounded region having a small radius, optionally less than 1 mm.

6. The insert of claim 1, wherein the elongated portion (23) of the first cutting edge (14) and the elongated portion (25) of the second cutting edge (15) extend approximately linearly.

7. The insert of claim 6, wherein the approximately linearly extended elongated portion (23) of the first cutting edge (14) has a length which differs from the length of the approximately linearly elongated portion (25) of the second cutting edge (15).

8. The insert of claim 6, wherein the elongated portions (23, 25) have at least one essentially straight section.

9. The insert of claim 8, wherein said elongated portions (23, 25) are formed by at least two smoothly merging straight sections.

10. The insert of claim 6, wherein said elongated portions (23, 25) include, over their length, an acute angle ($\alpha$) differing from null.

11. The insert of claim 1, wherein the insert (8) is formed with a through-hole (17) for attachment on a plate seat (6) of the milling cutter (1); and wherein a planar surface portion (17') is formed at the chip surface (34) of the insert (8) in the region of said through-hole (17).

12. The insert of claim 1, wherein clearance surfaces (31, 32) are formed on the insert adjacent the cutting edges (14, 15), which clearance surfaces (31, 32) are subdivided into subsurfaces (31-1 . . . , 31-6, 32-1 . . . , 32-6) of different clearance angles.

13. The insert of claim 1, further including an abutment surface (31-6, 32-6) formed in the tip regions (21, 27), and engagement surfaces being positioned essentially transversely with respect to said connecting line (8') connecting said tip regions, for accepting axial forces acting on the insert (8); and wherein the milling cutter (1) is formed with a plate seat (6) and at least one engagement surface to engage against said abutment surface (31-6, 32-6) formed on the insert.

14. The insert of claim 13, wherein the abutment surface (31-6, 32-6) located in the region of the tips (21, 22) of the insert is spaced from that cutting edge (14, 15) which is adjacent a respective support surface.

15. A milling cutter (1) having a milling cutter tool body (2) and defining a longitudinal axis (11) of rotation, said milling cutter having an end portion (3) formed with at least a first plate seat (6) and a second plate seat (7)

in combination with two identical cutting inserts as claimed in claim 1, wherein each of the two plate seats (6, 7) has one of said cutting inserts (8, 9) located thereon;

the first plate seat (6) being shaped and dimensioned to receive a first insert (8) in a position in which the first cutting edge (14) is active and projects from the tool body for cutting into a workpiece; and the second plate seat (7) is shaped and dimensioned to receive a second cutting insert (9) identical to said first cutting insert (8), in a position in which the second cutting edge (15) is active and projects from the tool body for cutting into the workpiece.

16. The combination of claim 15, wherein the first cutting edge (14) of the first insert (8) on the first plate seat (6), upon rotation of said tool body about its longitudinal axis, defines a circumferential circle which is essentially congruent at least over a region which is formed by the second cutting edge (15) of the second insert (9) located on the second plate seat (7).

17. The combination of claim 15, wherein the first plate seat (6) for the first insert (8) is shaped and dimensioned such that the longer one of the curved cutting edge portions (24) extends at least approximately up to the longitudinal axis (11) of the tool body; and the second plate seat (7) for the second insert (9) is shaped and dimensioned such that the shorter one of the curved cutting edge portions (25) ends spaced from said axis of rotation (11).

18. The combination of claim 15, wherein the number of cutting edges (14, 15) formed by each of the two inserts (8, 9), except at the region immediately adjacent the axis of rotation (11), is two.

19. The combination of claim 15, wherein at least one of the plate seats (6) is formed with a projection (51, 52) for interengagement with a recess (51', 51", 52) formed in the insert (8, 9) for acceptance of axial forces placed on the insert in operation of the milling cutter tool.

20. The combination of claim 15, wherein the plate seats (6, 7) include engagement surfaces (38) for engagement with a support surface (31-6, 32-6) formed on the insert (8).

21. The combination of claim 15, wherein at least one of the plate seat (6) on the tool body is formed with a lateral engagement surface (36, 37) for lateral support of the insert (8) located thereon; and wherein an upper edge (54) of the engagement surface effectively matches the inactive cutting edge 15) of the insert (8) secured to the plate seat (6) to prevent cutting chips from lodging between the insert and the tool body.

22. The combination of claim 15, further including additional plate seats (41, 42) formed on the tool body (2) and dimensioned and shaped for acceptance of indexable cutting inserts (43, 44) having straight cutting edges (46, 47).

23. The combination of claim 22, wherein the additional plate seats (41, 42) are axially offset with respect to each other.

* * * * *